Dec. 3, 1946. H. J. DORNAK 2,412,035
AIRCRAFT LANDING SIGNAL DEVICE
Filed Oct. 21, 1943 2 Sheets-Sheet 1
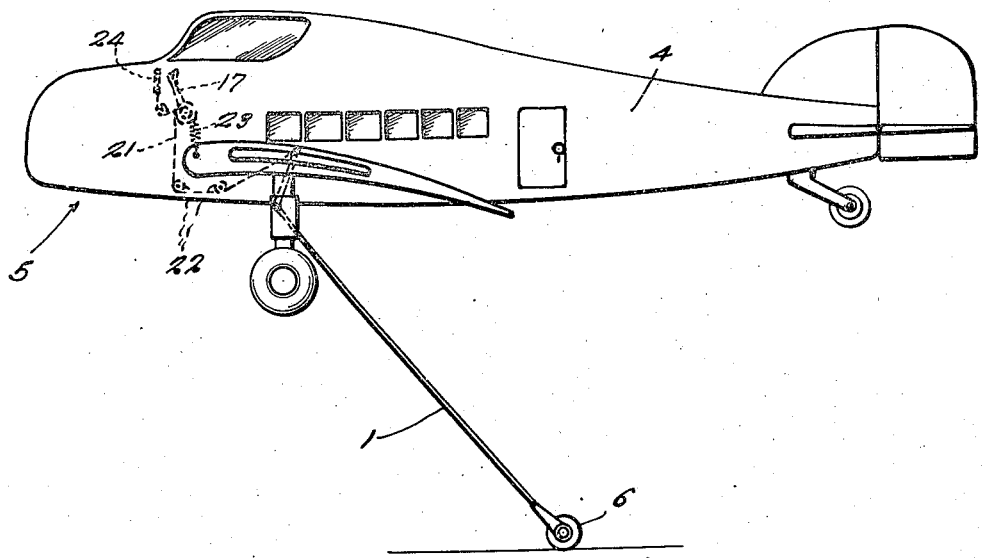
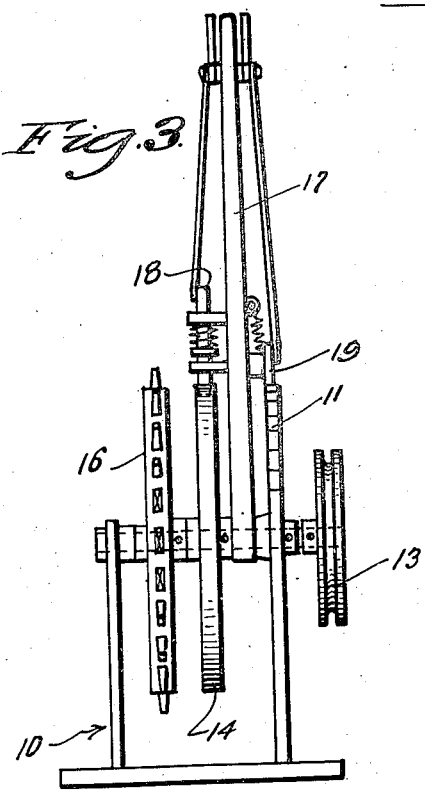
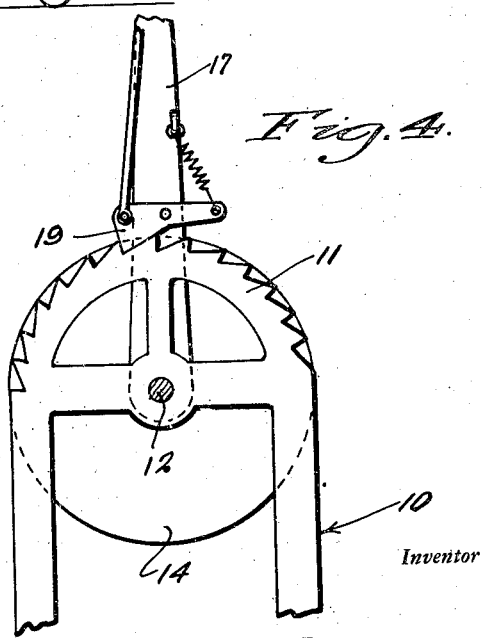
Henry J. Dornak Inventor
By Clarence A. O'Brien and Harvey B. Jacobson Attorneys

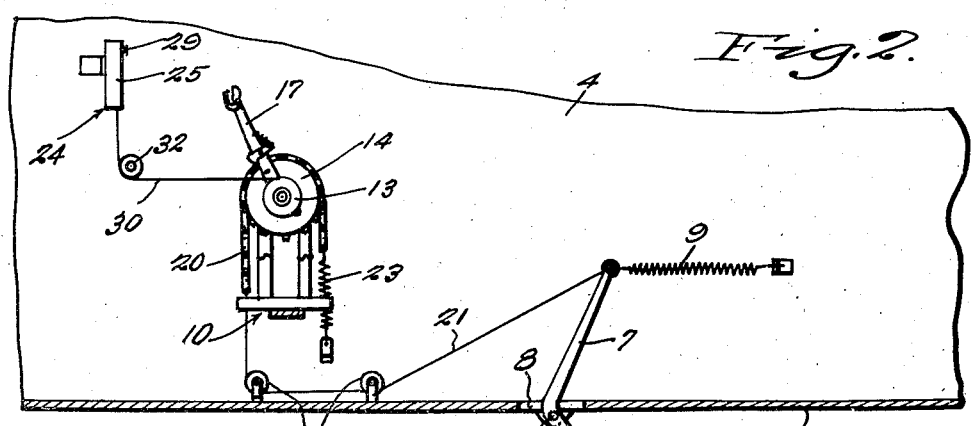

Patented Dec. 3, 1946

2,412,035

UNITED STATES PATENT OFFICE 2,412,035

AIRCRAFT LANDING SIGNAL DEVICE

Henry J. Dornak, Houston, Tex.

Application October 21, 1943, Serial No. 507,162

1 Claim. (Cl. 116—28)

The present invention relates to new and useful improvements in aircraft landing signal device, and has for its primary object to provide, in a manner as hereinafter set forth, novel means for positively and accurately indicating to the pilot who is about to make a landing the distance of the craft from the ground prior to the contact of the wheels of the landing gear therewith.

Other objects of the invention are to provide an aircraft landing device of the aforementioned character which will be comparatively simple in construction, strong, durable, highly efficient and reliable in operation, compact, light in weight, and which may be manufactured and installed at low cost.

All of the foregoing, and still further objects and advantages of the invention will become apparent from a study of the following specification, taken in connection with the accompanying drawings wherein like characters of reference designate corresponding parts throughout the several views, and wherein:

Figure 1 is a view in side elevation of an airplane equipped with a landing device constructed in accordance with the present invention, showing said device in lowered or operative position.

Figure 2 is a fragmentary view in vertical longitudinal section through a portion of the airplane fuselage, showing the installation of the apparatus therein.

Figure 3 is a view in front elevation of the operating mechanism of the device.

Figure 4 is a view in side elevation of a portion of the operating mechanism.

Figure 5 is a detail view in side elevation of the feeler raising disc.

Figure 6 is a view in front elevation of the height indicator.

Figure 7 is a view in horizontal section through the indicator, taken substantially on the line 7—7 of Figure 6.

Referring now to the drawings in detail, it will be seen that the embodiment of the invention which has been illustrated comprises a feeler 1 in the form of a pole, said feeler having one end portion pivotally secured at 2 to the bottom 3 of the fuselage 4 of an airplane 5. Journaled on the free end of the feeler 1 is a ground contact wheel 6. Projecting angularly from the pivoted end of the feeler 1 is an arm 7 which is operable in the fuselage 4, an opening 8 in the bottom 3 of said fuselage accommodating said arm. A coil spring 9 is connected to the arm 7 for yieldingly urging the feeler 1 downwardly and for maintaining the wheel 6 in contact with the ground when a landing is being made.

Mounted in the fuselage 4 forwardly of the arm 7 is a supporting structure 10 comprising a substantially segmental ratchet 11. A transverse shaft 12 is journaled in the supporting structure 10. Fixed on the shaft 12 is a drum 13, a disc 14 having a notch 15 in the periphery thereof, and a sprocket wheel 16. A hand lever 17 is loosely mounted on the shaft 12 between the disc 14 and the ratchet 11. A spring-pressed, manually retracted bolt 18 is slidably mounted on one side of the lever 17 and engageable in the notch 15 of the disc 14 for releasably connecting said hand lever to the shaft 12. Mounted on the opposite side of the hand lever 17 is a spring-pressed, manually retracted dog 19 which is engageable with the ratchet 11 for releasably securing said lever against swinging movement in one direction.

A chain 20 is trained over the sprocket wheel 16. A cable 21 is connected at one end to one end of the chain 20 and at its other end to the arm 7, guide pulleys 22 being provided for said cable. A coil spring 23 is connected at one end to the other end of the chain 20 and at its other end to any convenient fixed part. The spring 23 is lighter than the spring 9.

Mounted in the fuselage 1 for convenient observation by the pilot of the craft is an indicator 24. In the embodiment shown, the indicator 24 includes a vertically elongated casing 25, said casing comprising a front 26 having a vertical slot 27 therein. Feet indicating numerals 28 are provided on the casing front 26 on opposite sides of the slot 27. A pointer 29 is movable vertically in the casing 25 and cooperable with the indicating numerals 28. The pointer 29 is mounted between cables 30 and 31. The cable 30 extends upwardly into the casing 25 through the lower end thereof and has one end connected to the pointer 29. The other end of the cable 30 is secured to the drum 13 for winding thereon. A guide pulley 32 is provided for the cable 30.

A pulley 33 is journaled in the upper portion of the casing 25. The cable 31 is trained over the pulley 33 and is connected at one end to the top of the pointer 29. A coil spring 34 in the casing 25 is connected to the other end of the cable 31, said coil spring 34 being lighter or weaker than the spring 23. Green and red marks or lines 35 and 36, respectively, are provided on the upper and lower portions of the front of the casing 25.

It is thought that the operation of the apparatus will be readily apparent from a consideration of the foregoing. Briefly, the hand lever 17, when it is connected to the disc 14 and retained by the ratchet 11, secures the feeler 1 in raised or inoperative position against the tension of the spring 9. When a landing is about to be made and the device is to be brought into use, the pilot frees the disc 14 from the hand lever 17 by retracting the bolt 18. The feeler 1 now swings downwardly by gravity with the assistance of the spring 9 and the spring 23 is tensioned. As the feeler 1 swings downwardly, the shaft 12 is rotated by the elements 21, 20 and 16 in a direction to unwind the cable 30, thus permitting the spring 34 to move the pointer 29 to the upper portion of the casing 25 adjacent the green mark 35. As the craft continues to approach the ground after contact has been made by the wheel 6, the feeler 1 is swung upwardly against the tension of the spring 9. When this occurs, the shaft 12 is rotated in the opposite direction by the spring 23, the chain 20 and the sprocket wheel 16. In this manner the cable 30 is wound on the drum 13 and the pointer 29 is pulled downwardly in the casing 25 against the tension of the spring 34 for accurately indicating the distance of the craft from the ground. To raise the feeler 1 to fully retracted or inoperative position, the pilot swings the hand lever 17 forwardly for again engaging the bolt 18 in the notch 15 of the disc 14. The lever 17 is then swung rearwardly for elevating the feeler 1 against the tension of the spring 9 through the sprocket wheel 16, the chain 20 and the cable 21. The dog 19, riding over the ratchet 11 and engaging therewith, secures the feeler 1 in fully raised position. As the craft approaches the ground after contact of the feeler therewith, the pilot may cause gradual upward deflection of the nose of the craft and effect a good landing.

It is believed that the many advantages of an aircraft landing device constructed in accordance with the present invention will be readily understood, and although a preferred embodiment of the apparatus is as illustrated and described, it is to be understood that changes in the details of construction and in the combination and arrangement of parts may be resorted to which will fall within the scope of the invention as claimed.

What is claimed is:

In an aircraft landing signal device, a supporting structure, a horizontal shaft journaled in said supporting structure and having a drum and a sprocket wheel secured thereon, a sprocket chain trained over said sprocket wheel, a cable for connecting one end of said chain with an arm of a feeler pole, an elastic tension spring connected to the other end of said chain for rotating said shaft in one direction, a stronger elastic tension spring connected to said cable for rotating the shaft in the opposite direction, an indicator having a movable pointer, a spring for moving said pointer in one direction, a cable attached to said drum and connected to said pointer for moving the latter in the opposite direction, a hand-lever pivoted on said shaft, means to releasably connect said lever to said shaft so that the lever may be used to rotate the shaft in said one direction against the action of said stronger spring and so that the shaft may be freed to rotate in the opposite direction under the influence of said stronger spring, and means to releasably latch the lever to the supporting structure to prevent rotation of the shaft under the influence of said stronger spring when said lever is connected to said shaft.

HENRY J. DORNAK.